United States Patent
Huber, Jr. et al.

(10) Patent No.: US 7,306,295 B2
(45) Date of Patent: Dec. 11, 2007

(54) PUMP SYSTEM FOR PARKING BRAKES FOR A RAIL VEHICLE

(75) Inventors: Howard E. Huber, Jr., Black River, NY (US); Steven R. Newton, Adams, NY (US); Jeffrey F. Sauter, Lowville, NY (US); Robert L. Neulieb, Theresa, NY (US)

(73) Assignee: New York Air Brake Corporation, Watertown, NY (US)

( * ) Notice: Subject to any disclaimer, the term of this patent is extended or adjusted under 35 U.S.C. 154(b) by 284 days.

(21) Appl. No.: 10/790,150

(22) Filed: Mar. 2, 2004

(65) Prior Publication Data

US 2004/0189082 A1    Sep. 30, 2004

Related U.S. Application Data

(60) Provisional application No. 60/451,717, filed on Mar. 5, 2003.

(51) Int. Cl.
*B60R 25/08* (2006.01)
(52) U.S. Cl. .............. 303/89; 303/18; 303/15; 303/11; 188/106 P
(58) Field of Classification Search .......... 303/89, 303/3, 10, 7, 11, 15, 20, 71, 18, 68, 70, 13, 303/2; 188/106 R, 106 A, 106 P, 106 E
See application file for complete search history.

(56) References Cited

U.S. PATENT DOCUMENTS

| | | | |
|---|---|---|---|
| 3,844,624 A | * 10/1974 | Jones | 303/160 |
| 3,891,277 A | * 6/1975 | Cope | 303/2 |
| 3,944,286 A | 3/1976 | Engle et al. | |
| 4,201,277 A | 5/1980 | Meier et al. | |
| 4,653,812 A | 3/1987 | Engle | |
| 4,733,602 A | * 3/1988 | Smith et al. | 92/21 MR |
| 4,746,171 A | 5/1988 | Engle | |
| 4,841,872 A | * 6/1989 | Wicks et al. | 105/4.3 |
| 4,874,065 A | 10/1989 | Engle | |

(Continued)

FOREIGN PATENT DOCUMENTS

| EP | 0168050 | * 1/1986 |
|---|---|---|
| GB | 1404902 A | * 6/1975 |

OTHER PUBLICATIONS

Technology Digest, Evaluation of a Hydraulic Freight-Car Parking Brake, AAR, Aug. 1998.
Graham-White, SafeSet™ Hydraulic Parking Brake for Freights Cars, Air Brake Association Annual Technical Conference, Sep. 22, 1998.

*Primary Examiner*—Bradley King
(74) *Attorney, Agent, or Firm*—Barnes & Thornburg LLP

(57) ABSTRACT

The present disclosure relates to a pump system for parking brakes for a rail vehicle. The pump system includes at least one actuator, at least one pump and a reservoir as a fluid source. Also included is a manifold in fluid communication with the reservoir and the actuator. Further included are a plurality of valves and fluid paths internal to the manifold to allow fluid flow among the at least one pump and the reservoir.

7 Claims, 5 Drawing Sheets

U.S. PATENT DOCUMENTS 4,978,178 A     12/1990  Engle
5,701,975 A  *  12/1997  Hawryszkow ............... 188/52
5,813,731 A  *   9/1998  Newman et al. .............. 303/89
6,375,278 B1 *   4/2002  Sauter et al. ................. 303/89
6,394,559 B1 *   5/2002  Ring et al. .................... 303/13
6,848,754 B2 *   2/2005  Ring et al. .................... 303/71

* cited by examiner

PUMP SYSTEM FOR PARKING BRAKES FOR A RAIL VEHICLE

CROSS-REFERENCE

This is a non-Provisional Application under 37 C.F.R. §1.53(b) claiming priority to Provisional Application, Ser. No. 60/451,717, filed Mar. 5, 2003, which is hereby incorporated by reference herein.

BACKGROUND

The present disclosure relates generally to parking brakes for vehicles, such as trucks, locomotives, railcars, or other vehicles traveling on either roads and/or rails. In particular, the disclosure relates to a pump system for parking brakes for a rail vehicle.

Current technology relating to brake systems requires a high degree of manual input force in order to apply a parking brake by forcing a brake beam to apply a brake shoe to a rail vehicle wheel. Typically, the parking brake is applied by a network of levers, chains and brackets. The high manual force required to activate the brake may put workers at risk of injury.

Usually, the hand-operated brake comprises a device for manually applying a brake shoe to a wheel of a rail vehicle by turning a wheel. The handle or wheel is generally connected to the beam and shoe by gears or linkages. These linkages are the same linkages used to apply or release brakes throughout the truck or train.

Examples of this type of parking brake are well known in the art. Manual apply and release forces are required because an individual rail vehicle in the "parked" or "isolated" position generally does not include its own source of air pressure, which is the normal method of activating a rail vehicle's brakes when rail vehicles are coupled together in an operational mode.

Generally, braking systems initiate braking force on all wheels of a vehicle. Although this may sometimes be preferred, there is also a place for a system wherein a parking brake may be applied to only a selected number of rail vehicle wheels (fewer than all of the wheels of the vehicle) while still maintaining the vehicle in the parked position.

In some prior-art parking brake systems, a lengthy lever-type handle was incorporated into a parking brake. The lever-type handle was positioned so that an operator could operate a pump that would urge the brake shoe into contact with the wheel. Not only did this pumping action require a significant amount of labor, the labor was often inefficient. This lever-type handle provided about a 60 degree productive stroke followed by a 60 degree non-productive stroke.

Additionally, in most instances manual application of the parking brake requires up to 125 pounds of force in order to generate a 10-13% braking ratio, which is the generally acceptable braking ratio for a parking brake application. This application of force required a significant amount of operator strength and exertion, creating possible risks of operator injury.

As such, existing brake systems often incorporated electric motors to assist in providing the proper force and torque to turn a hydraulic pump to apply or release a parking brake.

SUMMARY

The pump system for parking brakes of the present disclosure greatly reduces the amount of force required to apply and release a parking brake. The invention's pump system calls for or requires approximately 65 pounds of wheel force in order to achieve the acceptable parking brake force, which represents almost a 50% reduction in the current wheel force required to achieve this parking brake force. Additionally, this reduction in force can be accomplished without the benefit of motors or electric means.

The present disclosure relates to a pump system for parking brakes for rail vehicles. The pump system includes at least one pump, a manifold, a reservoir and an actuator or a brake cylinder fluidly connected to apply and release a rail vehicle's brakes when the pump causes fluid to flow in the system. The pump design, depending on the parking brake system design, may be configured as follows: the pump type may be linear or rotational and may be single or bi-directional; and, the displacement type may be single, dual, multiple or variable. The manifold includes circuits, paths or passages that connect the pump's apply, release or other ports with the reservoir and the actuator or brake cylinder. When the pump is operated in an apply or release direction, flow is induced in a series of apply or release paths or circuits between the reservoir and the actuator or brake cylinder thereby extending or retracting a piston to apply or release the rail vehicle's brakes. The system may have a single or multiple pressure relief valves configured to allow fluid flow, which may be through a shuttle valve for a single relief valve, into the reservoir and/or actuator. The flow through the relief valve may be when the system pressure reaches a pre-determined level, thereby limiting the input load of a pump actuator.

The present disclosure also relates to a pump system for parking brakes for a rail vehicle that includes a bi-directional pump having pump apply and pump release ports and an actuator mounted to a manifold. Also included is a reservoir mounted to the manifold. The manifold connects the pump apply and pump release ports, respectively, with the reservoir. Further included is a brake cylinder having a brake apply port and a brake release port in fluid communication with the pump apply port and pump release port, respectively, and a brake piston.

The present disclosure further relates to a pump system for parking brakes for a rail vehicle that includes a reservoir as a fluid source, a manual pump, a motor pump and a manifold having a plurality of valves and fluid paths internally to allow fluid flow between the pumps and the reservoir. The reservoir and pumps are mounted directly to the manifold forming an integral unit.

The present disclosure also relates to a pump system for parking brakes for a rail vehicle that includes an actuator, a reservoir as a fluid source, a manual pump, a motor pump and a manifold in fluid communication with the reservoir and the actuator. Further included are a plurality of valves and fluid paths internal to the manifold to allow fluid flow among the actuator, the pumps and the reservoir. The reservoir and pumps are mounted directly to the manifold forming an integral unit.

The present disclosure also relates to a pump system for parking brakes for a rail vehicle that includes an actuator, a reservoir as a fluid source, a manual pump, a motor pump and a manifold in fluid communication with the reservoir and the actuator. Further included are a plurality of valves and fluid paths internal to the manifold to allow fluid flow among the actuator, the pumps and the reservoir. The reservoir, pumps and actuator are mounted directly to the manifold forming an integral unit.

The present disclosure further relates to a pump system for parking brakes for a rail vehicle that includes an actuator, a reservoir as a fluid source, at least one bi-directional pump and a manifold in fluid communication with the reservoir and the actuator. Also included are a plurality of valves and fluid paths internal to the manifold to allow fluid flow among the actuator, the at least one pump and the reservoir. The reservoir and the at least one pump are mounted directly to the manifold forming an integral unit.

The pump system of the present disclosure may have one or more bi-directional pumps which may be manually and/or electrically driven.

Other aspects and novel features of the present disclosure will become apparent from the following detailed description, when considered in conjunction with the accompanying drawings.

DETAILED DESCRIPTION

Figure 1:
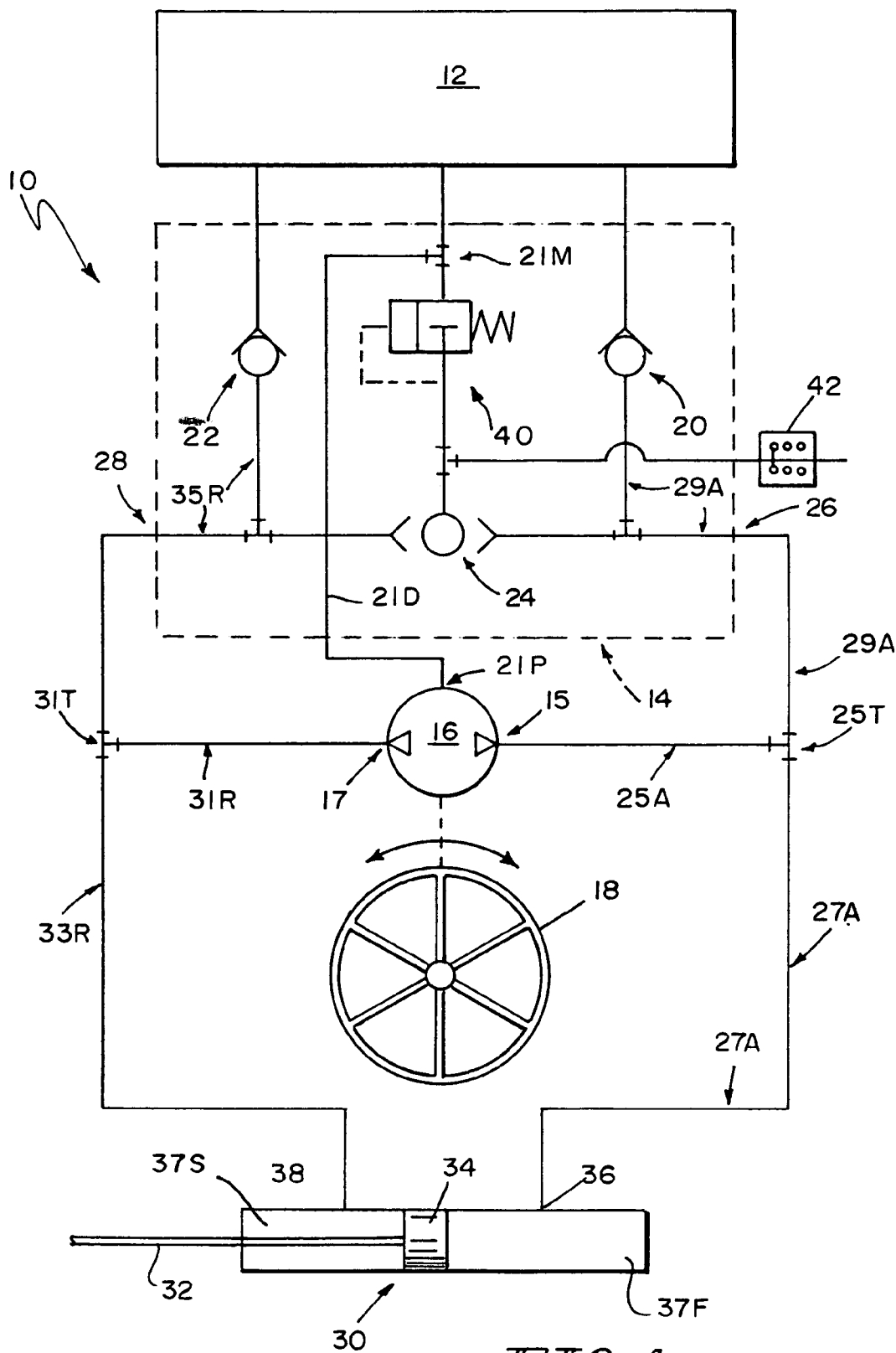
FIG. 1 is a schematic diagram of an embodiment of the pump system for parking brakes, according to the principles of the present disclosure.

The embodiment of FIG. 1 shows the parking brake or pump system 10 according to the principles of the present disclosure, which system 10 includes a pump 16 in fluid communication with a manifold 14, which is in fluid communication with a reservoir 12, which is the fluid source. The pump 16, manifold 14, and reservoir 12 may be coupled or formed as an integral unit (FIGS. 2 and 3), or a monolithic unit (not shown). Using fluid supplied from the reservoir 12, the bi-directional pump 16 can be placed in fluid communication with the manifold 14. For instance, when the pump 16 expels fluid in an apply direction, the fluid flows out of pump apply port 15 along pump apply path 25A to a T-fitting 25T where the fluid is directed along the brake apply path 27A to the cylinder apply port 36 of a brake cylinder or actuator 30. At the same time, fluid flows along manifold apply path 29A into the manifold at port 26. In contrast, when the bi-directional pump 16 expels fluid in a release direction, fluid is urged out pump release port 17 along pump release path 31R to a T-fitting 31T, where the fluid is directed along brake release path 33R to the cylinder release port 38 of the brake cylinder 30. At the same time, fluid flows along manifold release path 35R into the manifold 14 at port 28.

The brake cylinder 30 may include a brake piston 34 and a piston rod 32 that is connected to a brake beam (not shown) having brake shoes (not shown) which are applied to the train's wheels (not shown). Depending upon the connection of the brake cylinder 30, the apply and release ports 36, 38 may be reversed.

Pump 16 is a manually actuated bi-directional pump that may be activated or driven by a wheel 18 coupled to the pump 16, wherein the direction of rotation of the wheel 18 selectively controls the direction and magnitude of fluid flow from and to the pump 16. Pump 16 may also be driven by an electric motor (not shown).

The manifold 14 may have an apply check valve 20 in fluid communication with the reservoir 12 and also with the apply port 26 of the manifold 14. Additionally, the manifold 14 may have a release check valve 22 in fluid communication with the reservoir 12 and also with release port 28 of the manifold 14. When the pump 16 expels fluid in the apply direction through apply paths 25A and 29A, the system pressure closes apply check valve 20 thereby preventing fluid flow from the pump 16 through the apply check valve 20 to the reservoir 12. Concurrently, with a lower pressure on the release side (port) 17 of the pump 16, release check valve 22 may be opened, allowing fluid flow from the reservoir 12 to the pump 16. Conversely, when the pump 16 expels fluid in the release direction through release paths 31R and 35R, the system pressure closes release check valve 22 thereby preventing fluid flow through the release check valve 22 to the reservoir 12. Concurrently, with a lower pressure on the apply side (Port 15) of the pump 16, apply check valve 20 may be opened allowing fluid flow from the reservoir 12 to the pump 16.

The manifold 14 may further include a shuttle valve 24 and at least one relief valve 40. The shuttle valve 24 operates to allow fluid communication between the pressure relief valve 40 and the apply or release port 26 or 28, whichever has the higher pressure. The pressure relief valve 40 operates to release fluid into the reservoir 12 in the event the system pressure reaches a predetermined level, which for example, can be less or equal to 65 pounds of wheel 18 force. If the pressure does exceed a pre-determined level, the wheel 18 will require higher than the 65 pounds of force to turn. The shuttle valve 24 allows the use of one relief valve 40 for both apply and release. If two relief valves 40 are preferred, the shuttle valve 24 may be deleted. In order to allow one to monitor and view the pressure within the system, a pressure indicator 42 may be placed at or near the output of the shuttle valve 24.

The operation of a brake application can be seen when viewing FIG. 1. As the wheel 18 rotates in an apply direction to induce a flow from pump 16 out apply port 15, fluid travels through apply paths 25A and 27A into cylinder apply port 36, which is on the first side 37F of brake piston 34. As this occurs, the fluid volume on the first side 37F of the piston 34 expands and this fluid flow urges the brake piston 34 and the brake rod 32 to move in the apply direction (to the left, as viewed in FIG. 1). As the piston 34 moves in the apply direction, the fluid volume on the second side 37S of the piston 34 therefore decreases, causing or enabling fluid to flow from cylinder release port 38, through release paths 33R and 31R to the pump 16. The reservoir 12 will supplement this fluid flow as needed through check valve 22, and release path 35R to release port 28 to T-fitting 31T.

Conversely, the operation of a brake release occurs when the wheel 18 is rotated in the opposite or release direction. When rotated in this release direction, the bi-directional pump 16 expels fluid in the release direction out pump release port 17, thereby inducing fluid flow through release paths 31R, 33R into cylinder release port 38, which is on the second side 37S of brake piston 34. As fluid is introduced into cylinder release port 38, the brake piston 34 is biased in the release direction (to the right, as viewed on FIG. 1), forcing brake rod 32 to move in a release direction. As the piston 34 moves in the release direction, the fluid volume on first side 37F of the piston therefore decreases causing or enabling fluid to flow from cylinder apply port 36 through apply paths 27A and 25A to the pump 16. The reservoir 12 will supplement this fluid flow as needed through check valve 20 and apply path 29A to apply port 26 to T-fitting 25T.

Figure 2:
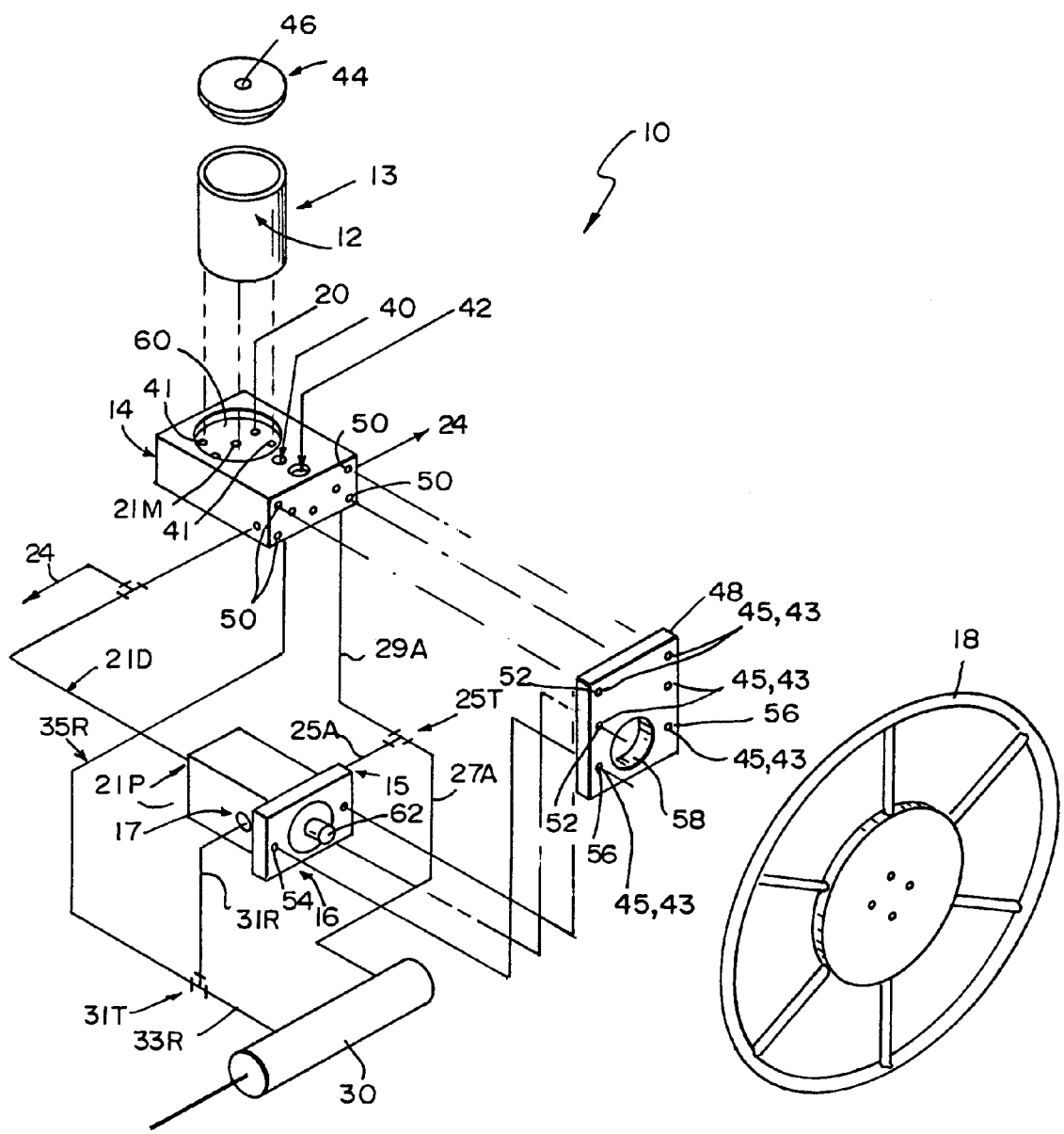
FIG. 2 is an exploded view of an embodiment of a pump system of FIG. 1.
Figure 3:
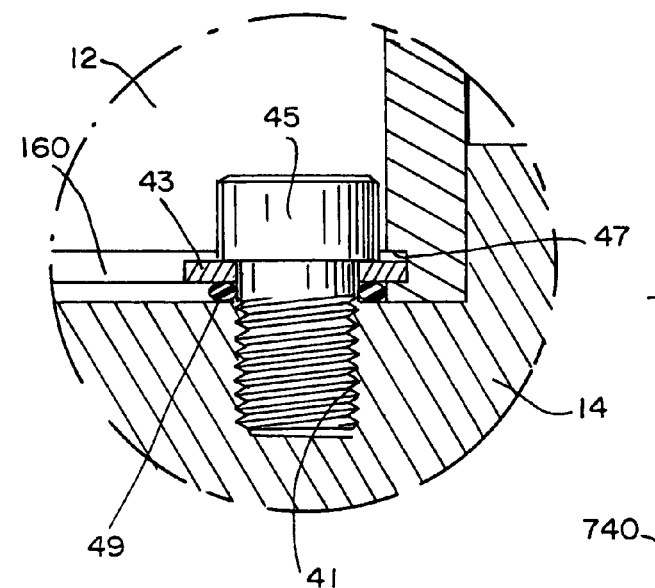
FIG. 3 is a partial cross-sectional view of one method of attachment of the reservoir to the manifold of the embodiment of FIG. 2.

As shown in FIG. 2, one preferred embodiment shows that the manifold 14, reservoir 12 and the pump 16 may be separate structures that are connected as an integral unit and placed in fluid communication with one another and with the brake cylinder 30. In other preferred embodiments, the pump 16, reservoir 12 and manifold 14 can, as mentioned, be formed as a monolithic unit with most, if not all, fluid connections being internal. Also, the reservoir 12 and the pump 16 may be a monolithic unit with the reservoir 12 and the other elements integrally connected. If formed as an integral unit as shown in FIGS. 2 and 3, the manifold 14 may have a recess 60 formed to receive the reservoir 12. The reservoir may be affixed into the recess 60 by any known connection means, such as bolts and washers using the reservoir openings 41.

As illustrated in FIG. 3, for example, the reservoir 12 may have a circumferential slot 47 which receives a flange or washer 43. A bolt 45 may extend through the washer 43 and an o-ring seal 49 into a threaded opening 41 in the reservoir recess 60 of the manifold 14.

If formed as a monolithic unit, the pump 16, reservoir 12 and manifold 14 may be combined by casting or molding or equivalent means to create a single unit (not shown).

As shown in FIG. 2, the reservoir 12 may include a site glass 13 allowing one to view the fluid level within the reservoir 12. Additionally, the reservoir 12 may include a cap 44 having a breather valve 46 which allows escape of excess fluid or movement of air across the breather valve 46. Within the manifold recess 60, the first check valve 20, and the second check valve 22 may be positioned in order to selectively prevent or allow fluid flow between the reservoir 12 and the manifold 14.

The pump 16 is connected to the manifold 14 through a series of ports 15, 17 and piping connections along paths 25A, 25T, 29A, 31R, 31T and 35R. The manifold 14 may further include the shuttle valve 24 and a single pressure relief valve 40, wherein the shuttle valve 24 operates to allow fluid flow between the pressure relief valve 40 and the apply or release port 26 or 28 (see FIG. 1), whichever has the higher pressure. The pressure relief valve 40 operates to release fluid into the reservoir 12 when the system pressures reaches a predetermined value. The pump 16 is connected to the brake cylinder 30 through a series of ports 15, 17 and piping connections 25A, 31T, 27A, 31R, 31T and 33R.

As shown in FIG. 2, mating of the pump 16 with the manifold 14 may be done using mounting plate 48, which may have mounting plate holes 52 and lower mounting plate holes 56. Holes 56 may be matched up with pump mounting holes 54 and holes 52 may be paired up with manifold mounting holes 50. The pump 16, manifold 14 and mounting plate 48 may be releasably secured to one another with washers 43 and threaded bolts 45, either or both of which may be self-locking. The wheel 18 may be attached to the pump 16 by securedly connecting a key slot (not shown) or woodruff-type key (not shown) or similar connecting means on the backside of the wheel 18 to the shaft of the pump 62 through opening 58 on the mounting plate 48. As shown in FIGS. 1 and 2, the pump 16 may have a drain port 21P to facilitate the flow of lost fluid from drain line 21D through the manifold 14 via manifold drain port 21M to the reservoir 12.

Figure 4:
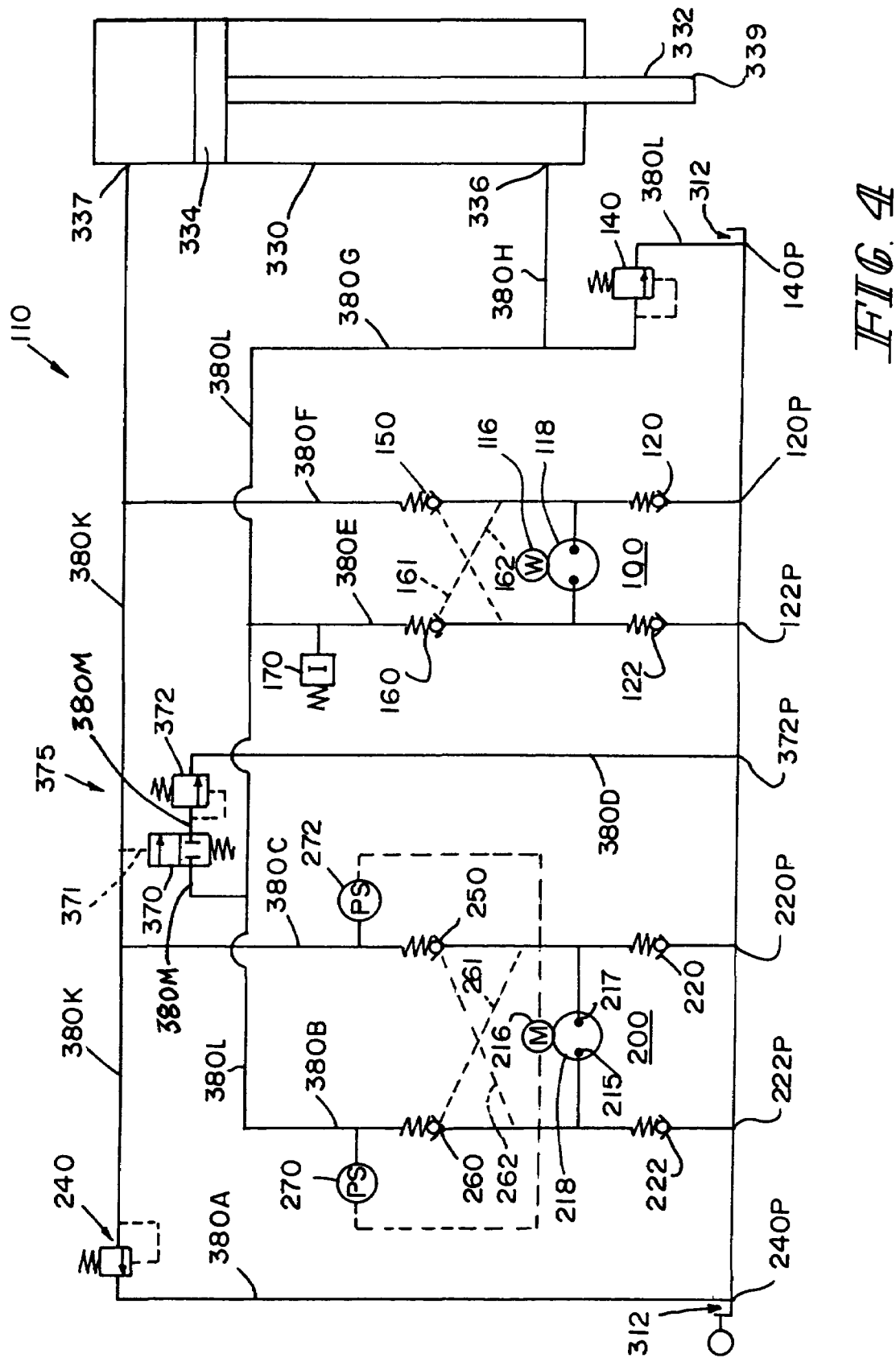
FIG. 4 is a schematic diagram of another embodiment of the pump system, according to the principles of the present disclosure.
Figure 5:
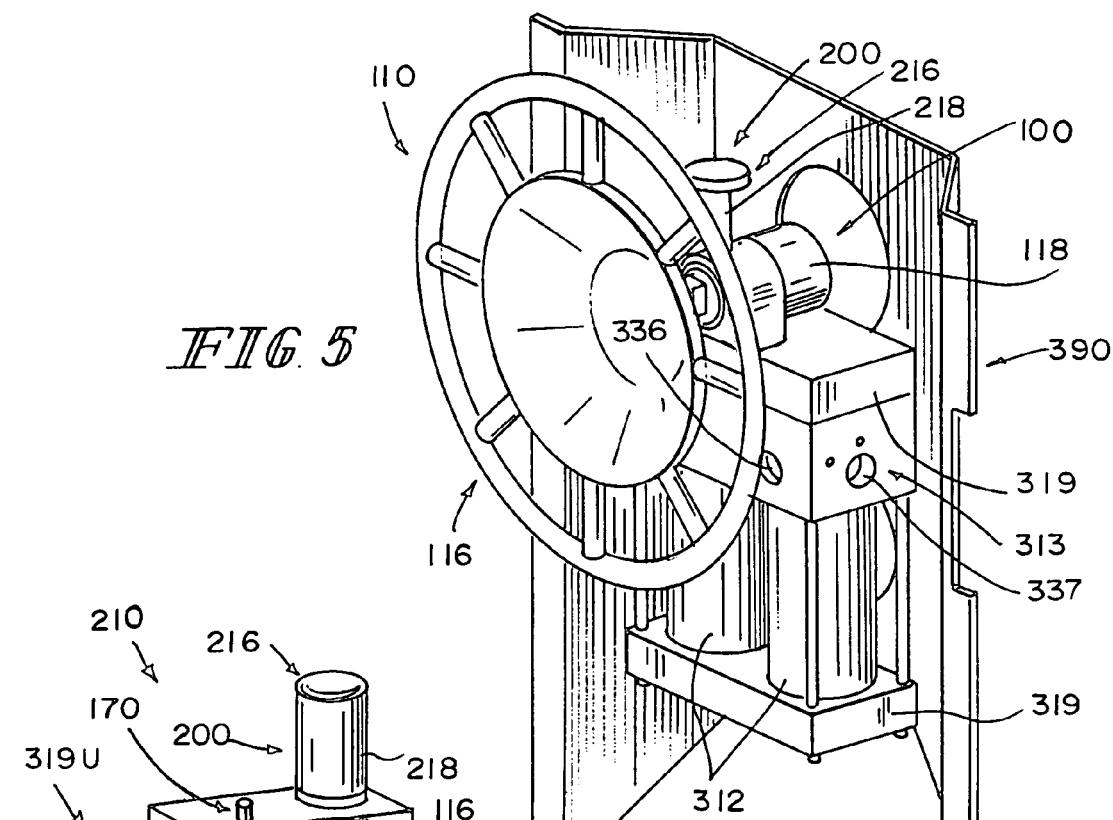
FIG. 5 is a perspective view of the embodiment of FIG. 4 as an integral unit without the actuator, connected to a mounting.

In another embodiment of the present disclosure, FIGS. 4 and 5 show a parking brake system 110, which includes a manual pump unit 100, motor pump unit 200, an actuator 330 and a common sump or reservoir 312 which acts as a fluid source. Manual pump unit 100 has a pump 118 driven by wheel 116. Motor pump unit 200 has a pump 218 driven by motor 216. Also included is a manifold 313 (see FIG. 5) in fluid communication with reservoir 312 and brake cylinder or actuator 330. Internal to the manifold 313 is a plurality of valves and fluid paths or circuits associated with each pump unit 100, 200, which paths are marked with the numerical designations 380 ranging from 380A-H and 380K-M, which paths allow fluid flow among the actuator 330, pump units 100, 200 and the reservoir 312. The reservoir 312, pumps 118, 218 and manifold 313 may be individual devices that may be coupled by plumbing or pipes (not shown). Or, they may be formed as an integral unit or formed as a monolithic unit. If formed as an integral unit, as shown in the preferred embodiment of FIG. 5, the manifold 313 may have a manifold cover or plates 319 formed to receive one or more of the reservoir 312 and pumps 118, 218. Alternatively, manifold 313 may have recesses (not shown) to receive one or more of the reservoir 312 and pump unit 100, 200. If formed as a monolithic unit, the pumps 118, 218, reservoir 312 and manifold 313 may be combined by casting or molding or other equivalent means to create a seamless single unit. In the embodiment shown, the pumps 118, 218 are mounted to upper plate 319U and the reservoirs 312 are mounted between the manifold 313 and the lower plate 319L and may be held together with long studs 338.

The system 110 is designed to operate essentially the same way regardless of whether the manual pump unit 100 or the motor pump unit 200 is in use. For convenience, in the present detailed description and in the accompanied drawings, similarly functioning elements are numbered so that the last two digits are the same. For example, pilot check valves 150 and 160 in the manual pump unit 100 fluid circuits function essentially identically to pilot check valves 250 and 260 in the motor pump unit 200 fluid circuits (see FIG. 4).

Using fluid supplied by reservoir 312, the system 110 can be charged, placing the pump units 100, 200 and the actuator 330 in fluid communication with the manifold 313. The plurality of valves in the manifold 313 may include one or more of the following: pilot check valves 150, 160, 250, 260; release check valves 122, 222; apply check valves 120, 220; pressure relief valves 140, 240; control valve 370; and relief valve 372. Also included in the manifold 313 are a plurality of fluid circuits 380A-H, K, L, M that fluidly connect the pumps 118, 218, reservoir 312 and the manifold 313 with the actuator 330 to manifold apply port 336 and manifold release port 337. Those fluid lines 380 also fluidly connect the manifold 313 to the reservoir 312 through ports 120P, 122P, 140P, 220P, 222P, 240P and 372P.

Reservoir 312 may be a single or multi-tank common reservoir for both pump units 100, 200. A multiple tank reservoir 312 is shown in the embodiment of FIG. 5, and a single tank reservoir is shown in the embodiment in FIG. 6.

Manual and motor pumps 118, 218 are bi-directional pumps. As mentioned earlier, manual pump unit 100 has pump 118 which may be activated by a wheel 116 coupled to the pump 118 wherein the direction of rotation of the wheel 116 selectively controls the direction and magnitude of fluid flow from and to pump 118. Motor pump unit 200 has pump 218 which may be activated by motor 216 which will control the direction and magnitude of fluid flow from and to pump 218.

The actuator 330 may include an actuator rod 332 with a connection point or area 334 that is configured to connect to a chain or cable (not shown) that is in turn connected to a brake beam lever or equivalent device (not shown) to apply and release a rail vehicle's brakes. A piston 334 is mounted on actuator rod 332.

System 110 operates, for the most part, by re-circulating fluid in a charged system 110. Fluid is generally only drawn from the reservoir 312 or fluid is only dumped or drained to the reservoir 312 under certain operating conditions, as discussed later herein. Using the manual pump unit 100 and its related valves and fluid circuits as an example (since both pump units 100, 200 operate essentially the same except for their respective power sources). With the system 110 in a brake release condition (not shown), when hand wheel 116 rotates in an apply direction, fluid flows through pump 118 via ports 117 and 115 up path 380E and opening check valve 160. The fluid then travels through paths 380L, 380G and 380H to the actuator 330 via port 336. The apply pressure at port 336 causes actuator piston 334 to move (toward the top in FIG. 4), pulling rod 332 with it. Rod 332 is connected at connection 339 to a chain or cable (not shown) and then to a brake beam lever or similar device (not shown) to apply the rail vehicle's brakes (not shown). The movement of the piston 334 forces fluid out of port 337 through paths 380K and 380F. The check valve 150 is opened by pilot pressure on pilot line 162 from the pump port 115. The fluid in path 380F is thereby connected to port 117 of the pump 118.

Pilot check valves 150, 160 also serve to prevent fluid flow toward pump 118 when motor pump unit 200 is in operation.

Should the apply pressure in path 380G exceed a desired limit, say, for example, approximately 1300 PSI, then release valve 140 will open and drain fluid to the reservoir 312 through path 380L and port 140P.

The fluid circuits for pump units 100, 200 also include a make-up circuit 375 that includes a control valve 370 and a relief valve 372. When manual pump unit 100 is functioning in an apply mode, more fluid is coming out of actuator 330 from port 337 than is going in at port 336. That is because the actuator rod 332 and piston 334 take up additional space in the actuator 330. Thus, in an apply situation, the fluid pressure coming along path 380K triggers the control valve 370 via pilot line 371, set for approximately 150 PSI, and when that amount of pressure is sensed it opens path 380M and at the same time release valve 372 is opened and fluid is allowed to drain from the apply paths 380L, 380G and 380H to reservoir 312 via path 380D and port 372P.

Conversely, the operation of a brake release occurs essentially in reverse. Fluid flows through pump 118 via ports 115 and 117, up path 380F through check valve 150 to path 380K and then to actuator 330 through port 337. Actuator piston 334 is driven down (in FIG. 4) along with rod 332 releasing the tension on chain connection 339 and supporting a release of the rail vehicle's brakes. Fluid is sucked out of port 336 via paths 380H, G, L and down path 380E to check valve 160. A signal by a pilot line 161 from pump port 117 opens check valve 160 permitting fluid flow to port 115 of the pump 118.

Should release fluid pressure exceed approximately 500 PSI, relief valve 240 will open and drain fluid to the reservoir 312 through path 380A and port 240P. When manual pump unit 100 is functioning in a release mode, less fluid is coming out of actuator 330 from port 336 than is needed to go in at port 337 (for the opposite reason as explained earlier). Therefore, the system will sense a need for more fluid to maintain the charged system, and release check valve 122 will open to allow sufficient fluid into path 380E to port 115 of the pump 118 to stabilize the fluid needs of the system 110. This puts the fluid back that was taken out by the make-up circuit 375 during the brake apply cycle.

Check valves 120 and 122 prevent fluid flow from paths 380F, E respectively, to reservoir 312. However, as indicated above, check valve 122 allows fluid to flow from the reservoir 312 into fluid path 380E during a release mode. On the other hand, check valve 120 can be used to permit a fluid flow from the reservoir 312 if a leak occurs in system 110.

Manual pump unit 100 may have a manual apply or status indicator 170 to indicate the pressure in the system 110.

The apply and release operations for the motor pump unit 200 are essentially the same as for the manual pump unit 100. However, the fluid circuits for the motor pump unit 200 may have an apply pressure switch 270 which may turn off the motor 216 when fluid pressure equals or exceeds approximately 1000 PSI in an apply mode. The fluid circuits of motor pump unit 200 may also have a release pressure switch 272, which may turn off the motor 216 when fluid pressure equals or exceeds approximately 300 PSI in a release mode. The on-off and directional control of motor 216 is not shown, but is well-known.

In the just described preferred embodiment of FIGS. 4 and 5, wherein the manual pump unit 100, motor pump unit 200, reservoir 312 and manifold 313 are formed as an integral unit (see particularly FIG. 5), that integral or integrated unit may be mounted on a mounting stand 390, which may itself be mounted on a rail vehicle (not shown).

Figure 6:
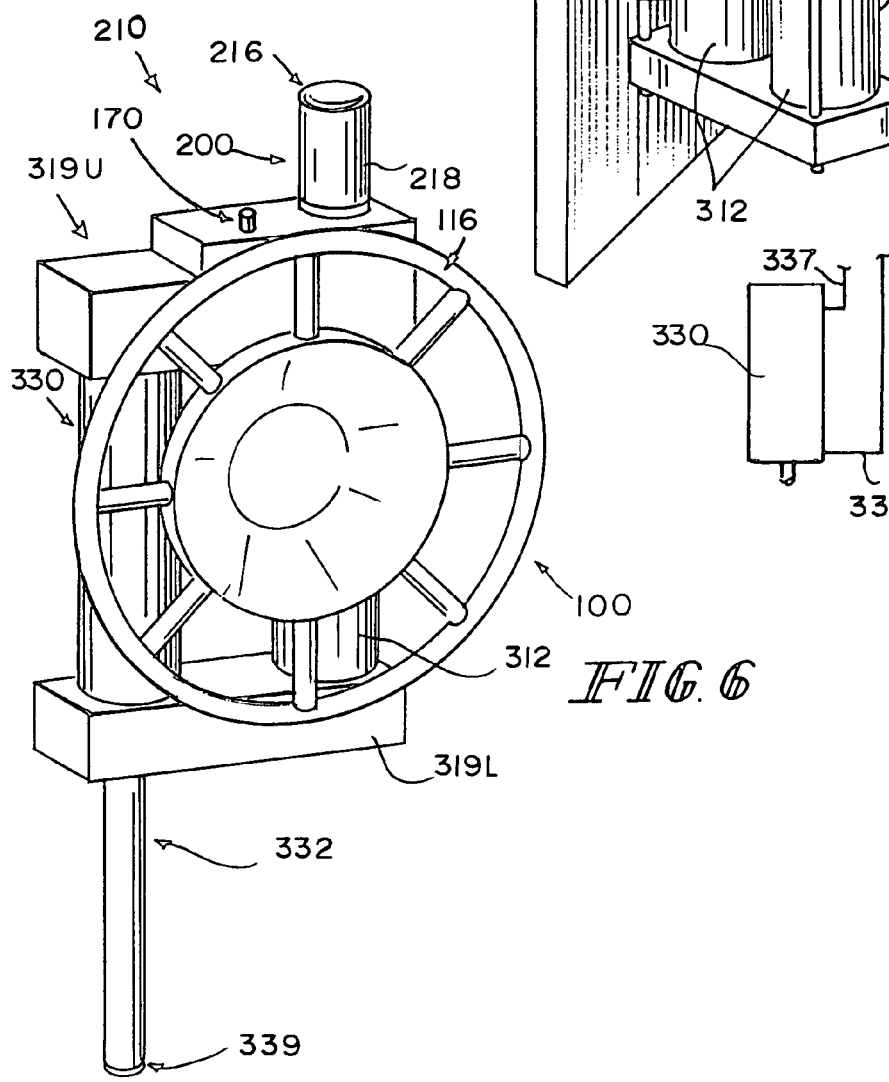
FIG. 6 is a perspective view of another embodiment of the pump system, according to the principles of the present disclosure.

In another embodiment, FIG. 6 shows pump system 210 that includes actuator 330, upper and lower manifold plates 319U, 319L, reservoir 312 (shown as a single tank), manual pump unit 100 (not visible behind wheel 116) and motor pump unit 200. Also shown are status indicator 170, actuator rod 332 and chain or cable connection point 339. The actuator 330 and reservoir 312 are sandwiched between the two manifold plates 319U and 319L and may be held together with long studs 338 or equivalent securing mechanism (not shown in FIG. 6, but shown in FIG. 5). The motor pump unit 218 is mounted on the top of the upper manifold plate 319U to have direct access to the reservoir 312. The manual pump 118 unit (not shown) is mounted on an interface plate (not shown) between the actuator 330 and the reservoir 312.

The manifold plates 319U, L house the plurality of valves, fluids circuits and switches, as described in the earlier embodiment of FIGS. 4 and 5, needed for proper operation of system 210. Pump system 210 operates essentially the same as pump system 110. The actuator 330 may have a built in load sensing device (not shown) that may be monitored by a pressure switch (not shown). The load sensing device gives an indication of an applied load. The status indicator 170 on the upper manifold plate 319U is used for visual pressure indication at the wheel 116.

The integrally formed manual pump unit 100, motor pump unit 200, manifold plates 319U, 319L and actuator 330 (as shown in FIG. 6) may also be formed as a monolithic unit (not shown). Either the integral unit or monolithic unit may also be mounted on a mounting stand 390 (as shown in FIG. 5).

The manual and motor pumps 118, 218 may be directly or remotely driven.

Figure 7:
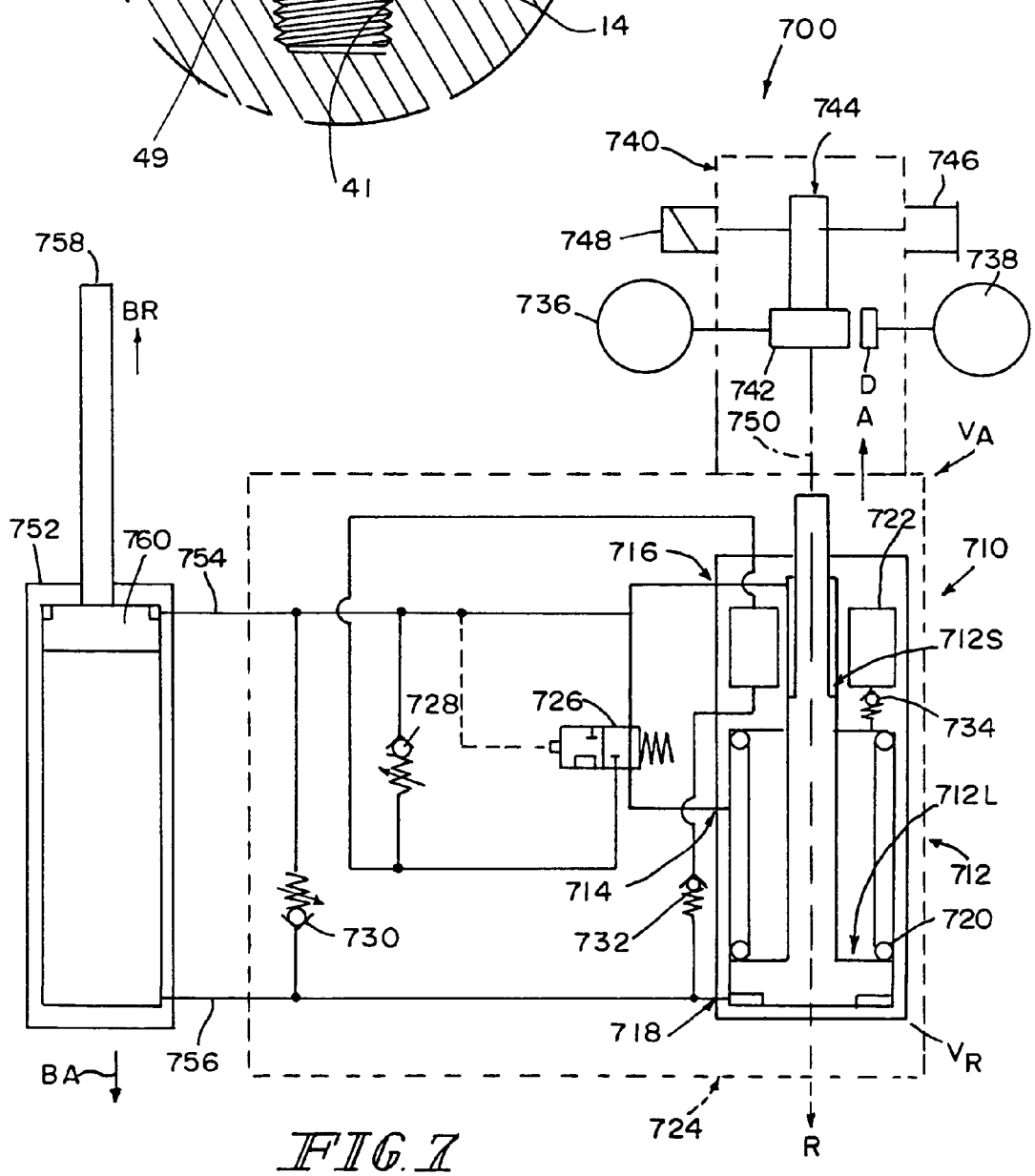
FIG. 7 is a schematic diagram of another embodiment of the pump system, according to the principles of the present disclosure.

In the above embodiments having a manual pump 118 and a motor pump 218, it is conceivable to have those two pumps replaced by a single pump that can be either manually or electrically driven, as shown in the embodiment of FIG. 7.

The pump system 700 of FIG. 7 shows a dual displacement linear pump 710 having a dual diameter, spring return piston 712 as well as at least two pump apply ports 714, 716 and at least one release port 718. The piston 712 has a spring 720 return. A reservoir 722 serves as a fluid source. A valve/pump manifold 724 includes therein or thereon the pump 710, a plurality of fluid lines and a plurality of valves including a pressure displacement or dual displacement kick-over valve 726, a high pressure relief valve 728, a low pressure relief valve 730 and at least two check valves 732, 734. The pump system 700 includes at least one pump actuator, shown in FIG. 7 as two pump actuators, including an electric motor 736 and wheel 738. The wheel 738 may be manually and/or hydraulically operated. An activation manifold 740 includes a clutch mechanism 742 and a quick release mechanism 744. The activation manifold 740 also includes ports or connections to the electric motor 736, wheel 738, a quick release manual device 746 and a quick release electrical device 748 as well as a connection to the pump 710, which may be, for example, a chain or a cable 750. The pump 710 of FIG. 7 is in a released position.

Also shown is an hydraulic brake cylinder 752 connected with the valve/pump manifold 724 via hydraulic cylinder apply line 754 and hydraulic cylinder release line 756 for the application and release of the parking brakes of a rail vehicle via, for example, a lever or chain connection 758. In a brake application mode, brake cylinder piston 760 moves in direction BA and in a brake release mode, the piston 760 moves in direction BR. Brake cylinder 752 is shown as FIG. 7 in a released position.

The pump 710 and reservoir 722 may be mounted together in the manifold 724 forming an integral unit or may be formed as a monolithic unit. The pump may be mono- or bi-directional and is shown on FIG. 7 as bi-directional pump. The pump 710 has a single action or single stroke for each of apply and release operations.

The clutch mechanism 742 is generally always connected with the motor 736. However, the wheel 738 is disengaged during a motor operation, as indicated, for example, at D in FIG. 7. The wheel 738 automatically engages with the clutch mechanism 742 upon initiation of and during a wheel operation and, concurrently, electrical power is cut-off to the motor 736. When the brake cylinder 752 has received sufficient force to apply the rail vehicle's brakes, maintaining a hand to the wheel 738 or power to the motor 736 is not required. The apply force will maintain the brake cylinder's load or the applied position of the piston 760 if there is no system leakage or variations in temperature. If the brake cylinder 752 has a mechanical locking device (not shown), the apply pressure/force may be able to be removed and the brake cylinder 752 will maintain its load or its applied position. For the pump 710, the clutch mechanism 742 is configured to hold or lock the pump piston 712 in an applied position.

The clutch mechanism 752 is configured such that, during an apply operation, the chain or cable 750 is windable on a receiving device (not shown) having, for example, a detent (not shown) for locking or securing the clutch mechanism 752 and/or the receiving device. During a release operation, the detent may be unlocked and the chain or cable 750 would be unwound from the receiving device. In such release operation, the clutch mechanism 742 may thus be freewheeling.

The quick release devices 746, 748, upon activation, disengage the locked clutch mechanism 742 and allow release of the pump piston 712 from an applied position, which is illustrated by the direction of arrow A. The piston 712, being spring-loaded, returns to a released position, illustrated by the direction of arrow R. When the pump piston 712 is in its applied and/or released positions, respective visual indicators, shown, for example as $V_A$ and $V_R$, are provided at respective ends of the pump piston 712. It is also conceivable to configure the clutch mechanism 742 such that a counter-rotation of the wheel 738 may release the pump piston 712 and/or a reversal of the electric motor 736 will do likewise. Movement of the pump piston 712 in a release operation in direction R reduces pressure on apply ports 714, 716 thereby reducing/removing the load or pressure on the hydraulic cylinder 752 if the hydraulic cylinder 752 has no mechanical lock. If the hydraulic cylinder 752 has a mechanical lock (not shown), the pump piston 712, when moved in the release direction R, will create pressure through pump release port 718 and hydraulic cylinder release port 756 and unlock the locking mechanism on the hydraulic brake cylinder 752. Continued movement of the pump piston 712 will eventually move the hydraulic cylinder 752 to a full release position, as shown in FIG. 7.

During an apply operation, fluid from pump 710 initially flows out of apply ports 714 and 716. When pressure builds up to a predetermined value in cylinder apply line 754, the dual displacement kick-over valve 726 reacts and blocks off fluid flow to apply line 754 emanating from movement of a larger pump piston face or diameter 712L via manifold apply port 714 and vents that fluid flow to reservoir 722. Fluid flow continues emanating from movement of a smaller pump piston face or diameter 712S via manifold apply port 716 to apply line 754.

The high pressure relief valve 728 is configured to allow fluid flow into the reservoir 722 when a system pressure at the pump apply port 754 reaches a pre-determined level, thereby limiting an input force from the actuators 736, 738.

The low pressure relief valve 730 is configured to permit fluid flow from the pump 710 into the reservoir 722 during a portion of the release operation, thereby permitting the pump piston 712 to reach a fully-released position, as shown in FIG. 7.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. The pump system for parking brakes for a rail vehicle comprising:
   a bi-directional pump having pump apply and pump release ports and an actuator mounted to a manifold;
   a reservoir mounted to the manifold;
   the manifold connecting the pump apply and pump release ports, respectively, with the reservoir;
   a brake cylinder having a brake apply port and a brake release port in fluid communication with the pump apply port and pump release port, respectively, and a brake piston;
   the system further including a control valve responsive to fluid pressure at the brake release port and configured to pilot a pressure relief valve configured to allow fluid flow into the reservoir when a pressure at the pump apply port reaches a pre-determined level; and wherein the pump and the reservoir are mounted directly on the manifold forming an integral unit.

2. The pump system of claim 1, wherein the actuator is a wheel rotatably coupled to the pump.

3. The pump system of claim 2, wherein the direction of rotation of the wheel selectively controls the direction of fluid flow from the pump.

4. The pump system of claim 1, wherein the manifold further includes an apply check valve and a release check valve that selectively connect the pump apply and pump release ports, respectively, to the reservoir.

5. The pump system of claim 4, wherein the apply check valve prevents fluid flow from the pump through the apply check valve to the reservoir when the pump expels fluid in an apply direction and allows fluid flow between the reservoir and the pump when the pump expels fluid in a release direction.

6. The pump system of claim 5, wherein the release check valve prevents fluid flow from the pump through the release check valve to the reservoir when the pump expels fluid in a release direction and allows fluid flow between the reservoir and the pump when the pump expels fluid in an apply direction.

7. The pump system of claim 1, wherein the pump system requires approximately 65 pounds of actuator force to achieve an acceptable parking brake force.

* * * * *